United States Patent [19]

Golding, Sr.

[11] 4,279,440

[45] Jul. 21, 1981

[54] MOTOR VEHICLE CAMPER

[76] Inventor: Russell J. Golding, Sr., 1823 Manchester Rd., Akron, Ohio 44314

[21] Appl. No.: 961,678

[22] Filed: Nov. 17, 1978

[51] Int. Cl.³ .............................................. B60P 3/34
[52] U.S. Cl. .................................................... 296/164
[58] Field of Search ............................. 296/156–176, 296/137 R; 135/1 A, 3 A

[56] References Cited

U.S. PATENT DOCUMENTS

| | | | |
|---|---|---|---|
| 2,983,780 | 7/1959 | Ervine | 296/164 |
| 3,002,760 | 10/1961 | Lee | 280/43.23 |
| 3,111,955 | 11/1963 | Green | 296/161 X |
| 3,111,955 | 11/1963 | Green | 135/1 A |
| 3,257,019 | 6/1966 | Carroll | 414/498 |
| 3,289,684 | 12/1966 | Lowe | 296/159 X |
| 3,437,372 | 4/1969 | McGarry | 296/164 |
| 3,575,460 | 4/1971 | Kennedy | 296/160 |
| 3,608,954 | 9/1971 | Lynd | 296/164 |
| 3,635,515 | 1/1972 | White et al. | 296/164 |
| 3,656,724 | 4/1972 | Greehaigh | 296/159 |
| 3,659,893 | 5/1972 | Steele | 296/164 |
| 3,733,102 | 5/1973 | Serino et al. | 296/164 |
| 3,955,731 | 5/1976 | Lindeief | 224/328 |
| 4,027,912 | 6/1977 | Pacca | 296/164 X |
| 4,057,284 | 11/1977 | Blank | 296/173 X |
| 4,176,873 | 12/1979 | Burr et al. | 296/156 |
| 4,223,689 | 9/1980 | Cox | 296/164 X |

FOREIGN PATENT DOCUMENTS 963781  7/1964  United Kingdom ................. 296/165

*Primary Examiner*—John P. Silverstrim
*Assistant Examiner*—Norman L. Stack, Jr.
*Attorney, Agent, or Firm*—Reese Taylor

[57] ABSTRACT

A camper suitable for mounting on a motor vehicle is disclosed and includes a generally rectangular frame which supports first and second living compartments. The frame carries means for releasably and adjustably securing it to the bumpers of the vehicle and supporting it thereon and these means are also capable of supporting the camper in a freestanding arrangement separate from the vehicle. The first and second living compartments are alternately collapsible and expandable so as to be converted from a traveling or storage mode to an occupancy mode. Additionally, the second compartment is capable of being telescoped into the first compartment when it is collapsed thereby rendering the overall structure extremely compact for purposes of transportation and also achieving the advantage of virtually eliminating any impairment of the visibility of the operator of the vehicle. The camper also includes means for ready ingress and egress and a telescoping and folding canopy capable of being extended from one of the compartments.

14 Claims, 14 Drawing Figures

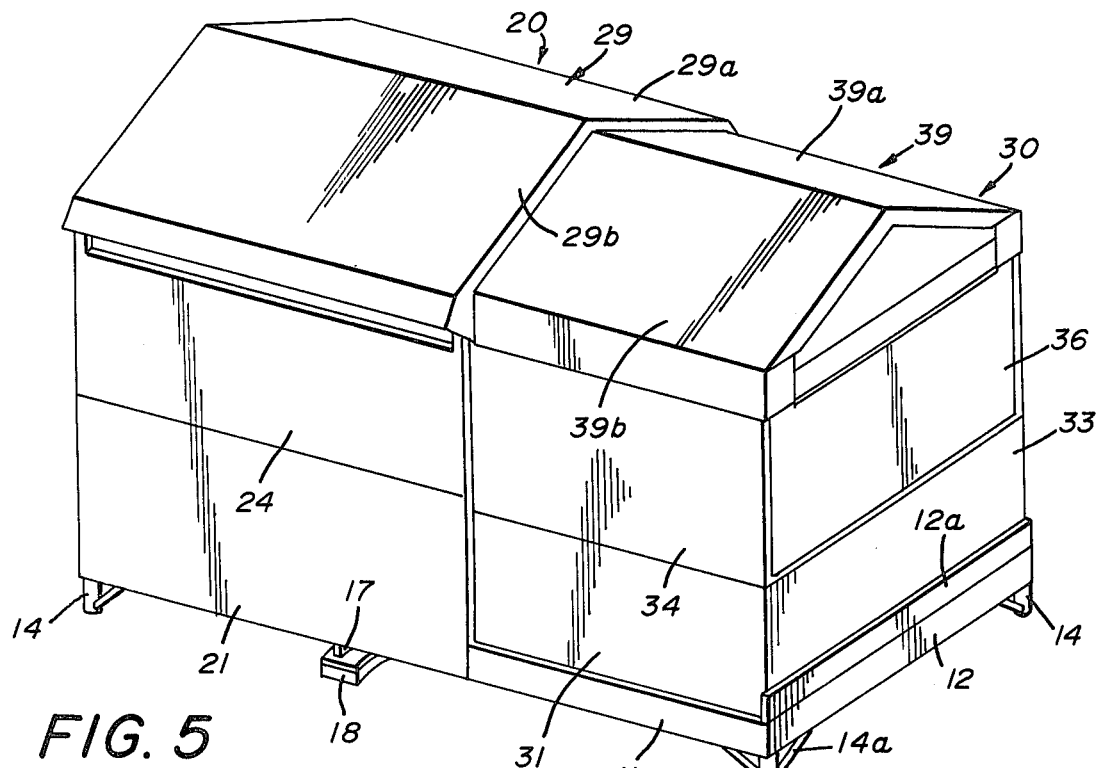
FIG. 5
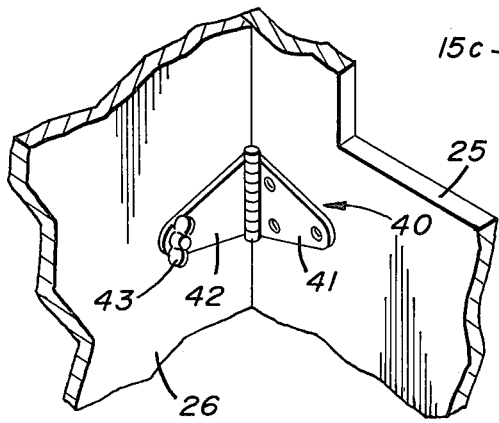
FIG. 6
FIG. 7
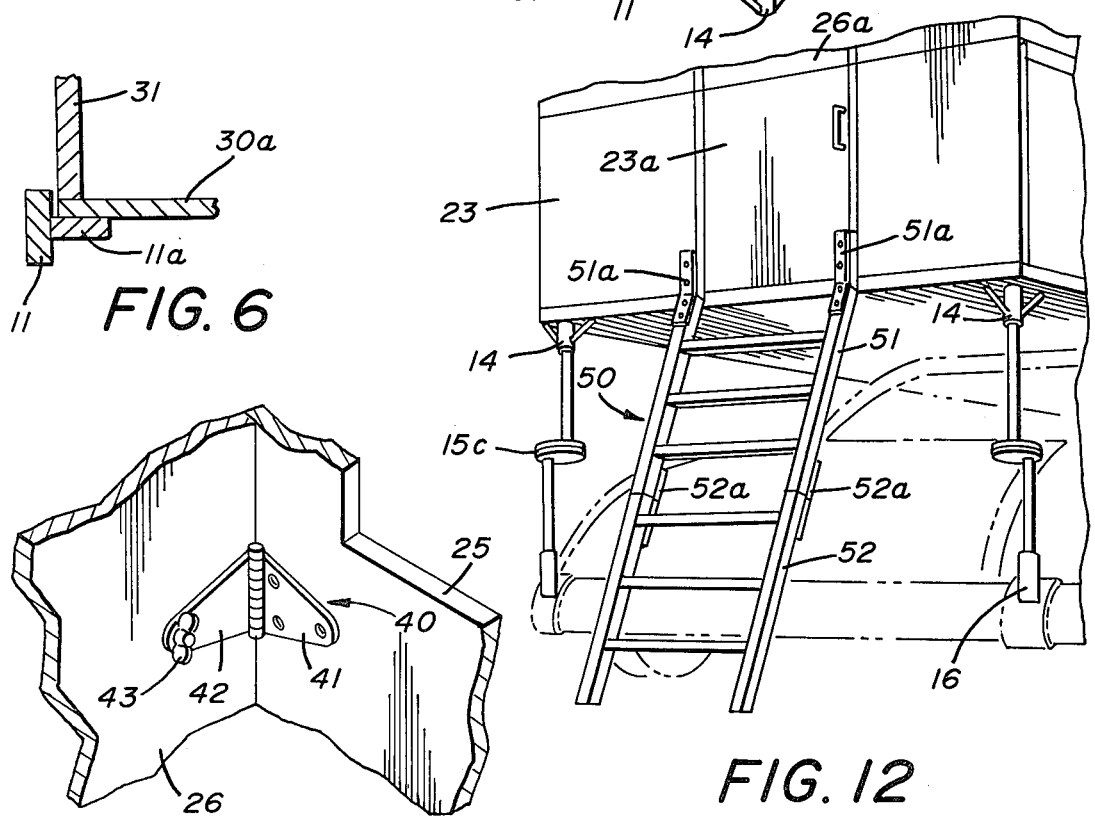
FIG. 12

MOTOR VEHICLE CAMPER

FIELD OF THE INVENTION

This invention relates, in general, to campers or other temporary living quarters suitable for temporary mounting on and transportation by a conventional motor vehicle. The invention relates in particular to such a device which is collapsible both vertically and longitudinally so as to achieve maximum compactness during transportation and also so as to cause minimal impairment to the vision of the vehicle operator.

PRIOR ART STATEMENT

"Campers" or other temporary living quarters which can be mounted on motor vehicles either permanently or temporarily are well known in the prior art. Such campers take many forms and the patent prior art is quite illustrative of the various types of structures available.

For example, Green U.S. Pat. No. 3,111,955 discloses a box-like structure utilizing four tubular uprights which are fixed to the front and rear bumpers of the vehicle. The box-like living structure is secured to this frame and is capable of expansion so as to form living quarters.

Greenhalgh U.S. Pat. No. 3,656,724 discloses a cabin which is supported by a plurality of tubes and rods on the bumpers of a vehicle and partially supported by the roof thereof with the device being capable of being expanded vertically to form a rigid enclosure.

Kennedy U.S. Pat. No. 3,575,460 discloses a device capable of being carried on the roof of a motor vehicle and capable of being expanded from a compact carrying position to an extended occupancy position.

Carroll U.S. Pat. No. 3,257,019 discloses a device mounted on the bumper and roof of a motor vehicle and capable of being expanded vertically to provide an enclosure. McGarry U.S. Pat. No. 3,437,372 discloses a roof mounted vehicle camper with an elevating roof capable of being expanded from a collapsed carrying position to an expanded occupancy position.

White U.S. Pat. No. 3,635,515 illustrates a cabin which is intended to be carried on the top of a vehicle and which is capable of being raised between upper and lower positions for occupancy.

Serino U.S. Pat. No. 3,733,102 discloses an automobile camper capable of being expanded from a collapsed carrying position to an expanded occupancy position.

Lindelef U.S. Pat. No. 3,955,731 discloses a low profile type carrier having a hinged arrangement for vertical expansion.

Lee U.S. Pat. No. 3,002,760 discloses an auxiliary trailer body suitable for camping use mounted on the bed of a pickup truck.

Accordingly, as noted initially, there are a number of variations on the basic theme of mounting a camper on a motor vehicle and most of these involve the utilization of some means for expanding the camper from a collapsed carrying condition to an enlarged or vertically expanded occupancy condition.

Many of these approaches, however, present difficulties which are intended to be overcome by Applicant's invention.

For one thing, most of the art is either somewhat limited in its ultimate expanded size or, if not so limited, is liable to interfere with the vision of the vehicle operator because it extends over the hood and windshield areas. This difficulty arises from the natural desire to obtain the maximum living area compatible with the size and carrying capacity of the vehicle.

For example, probably the maximum planar floor area of the camper which is feasible without seriously impeding the manuverability and operability of the carrying vehicle is one which approximates the peripheral dimensions of the vehicle. An example of this can be seen in Greenhalgh U.S. Pat. No. 3,656,724 referred to above wherein the cabin extends from the front to the rear bumper of the vehicle and from side to side thereof. This would probably enable the expanded structure to be of the maximum practical size. The difficuly is, however, that this type of structure overhangs the windshield and hood area of the vehicle and would appear to cause significant impairment in the vision of the operator of the vehicle thereby presenting obvious safety problems.

BRIEF SUMMARY OF THE INVENTION

It has been found that a camper designed to be carried by a motor vehicle can be devised having the desirable characteristics of being collapsible to an extremely compact condition thereby presenting minimal wind resistance and improved carrying properties; being expandable to maximize the living area once the device is put to its intended ultimate use; and achieving both of these desirable results without any significant impairment of the vision of the vehicle operator.

Thus it has been discovered that a generally rectangular frame can be provided which can be releasably supported on the bumpers of the vehicle and, if desired, by the roof of the vehicle intermediate its ends.

It has been found that a first living compartment, which is collapsible in a vertical direction by means of hinged side walls and roof members, can be secured to the rear portion of the frame.

It has further been found that a second compartment, also suitable for vertical expansion by means of suitably hinged side walls and roof members, can be provided on the front portion of the frame or, in other words, on the portion of the frame which overlies the windshield and hood area of the vehicle.

It has further been discovered that by dimensioning the second compartment suitably, the same can be telescoped into the first compartment when both compartments are in collapsed condition so as to free the areas necessary for the driver's visibility.

It has also been found that the means for attaching the camper to the vehicle can be made adjustable so as to provide some latitude in conforming to the dimensions of various sized vehicles.

Accordingly, production of an improved motor vehicle camper of the character above-described becomes the principal object of this invention with other objects thereof becoming more apparent upon a reading of the following brief specification considered and interpreted in view of the accompanying drawings.

OF THE DRAWINGS

FIG. 5 is a view similar to FIG. 4 showing the camper in its fully elevated condition with the roof in place.

FIG. 6 is a sectional view taken along the line 6—6 of FIG. 2.

FIG. 7 is a partial perspective view showing means for locking the side walls of the compartments in elevated condition.

FIG. 12 is a partial perspective view showing the means for ingress and egress.

BRIEF DESCRIPTION OF THE PREFERRED EMBODIMENT

Figure 1:
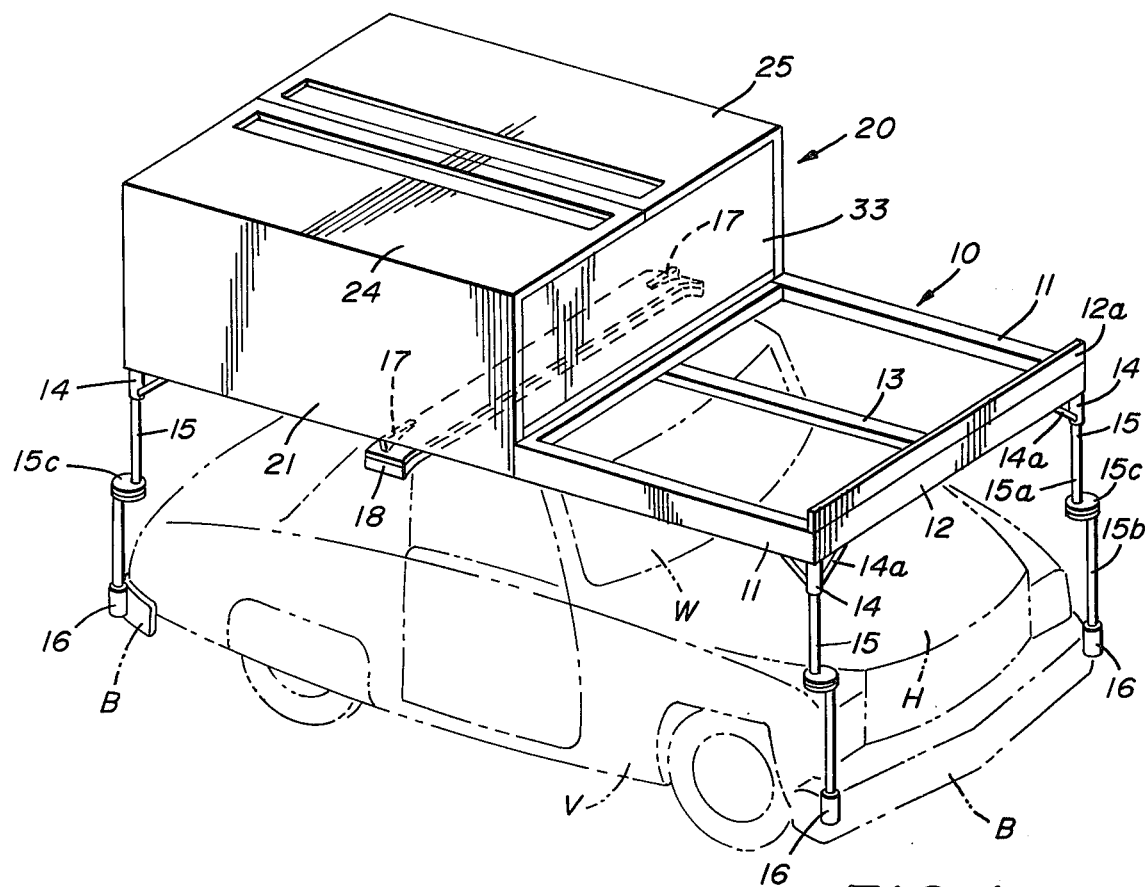
FIG. 1 is a perspective view, partially in phantom, showing the vehicle camper mounted and in condition for transportation.

Referring first to FIG. 1, it will be noted that the camper is intended to be carried on a vehicle which is shown in broken or phantom lines. The vehicle is illustrated as being a two door passenger car having a windshield W, a hood H and bumpers B,B. This is for purposes of illustration only and it should be understood that the camper of this invention could be used with virtually any type of motor vehicle.

Turning then again to FIG. 1 for a description of the camper itself, it will be noted that a generally rectangular frame 10 is provided and includes longitudinally extending side rails 11,11 and a front rail 12 which interconnects the ends of the side rails 11,11. A centrally disposed rail 13 is secured to front rail 12 and is positioned in parallelism with the side rails 11,11 for purposes which will be described. Front rail 12 also has a vertically projecting stop member 12a which serves to limit forward travel of the second compartment as will also be described.

Depending from the four corners of the frame 10 are sockets 14,14 which are secured to the frame by welding or other suitable means and stabilized by means of the braces 14a,14a.

In order to mount the device on the bumpers B,B of the vehicle V, the ends of vertically extending support rods 15,15 are received in the sockets 14,14. These rods may be releasably secured in the sockets 14 by such means as set screws, for example, or maybe permanently secured therein by welding, for example.

A series of sockets 16,16 are welded or otherwise secured to the bumpers B,B of the vehicle V and the opposed ends of the rods 15 are inserted therein and secured therein by any desirable means. In this fashion the frame 10 is securely but releasably mounted on the vehicle V.

In some instances, due to the length of the camper, it may be desirable to also support it intermediate its ends on the roof of the passenger compartment of the vehicle. To this end braces 17,17 are secured to the lower side of frame 10 and carry a mounting pad 18 comprising a rigid backing and a soft vehicle contacting pad.

It will also be noted that the support rods 15,15 are illustrated as being in two sections 15a and 15b and interconnected by adjustment means 15c. This structure is intended to provide a capability to utilize the camper on vehicles having varying length or width dimensions and provide adjustability in that regard.

Figure 11:
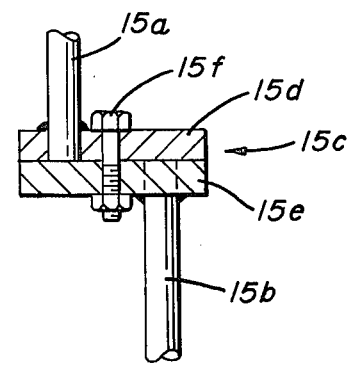
FIG. 11 is a partial elevation partially in section showing the detail of the adjustable support means.

Thus, referring to FIGS. 1 and 11, it will be seen that adjustment means 15c includes plates 15d and 15e. Support rod section 15b is secured to plate 15e and support rod section 15a is secured to plate 15d. The plates 15d and 15e and their attached rod sections can be moved relatively of each other until the desired offset is reached, following which a hole may be drilled through the plates and they can be secured by nut and bolt 15f. Other means for securing adjustment means 15c could be employed, but it is considered advantageous to be able to make some adjustment for various size vehicles.

In this way, with pin 15h removed plates 15d and 15e may be pivoted relatively of each other until the desired setting is achieved, following which the pin or set screw 15h may be inserted.

Mounted on top of the rear portion of the frame 10 is the first compartment assembly 20. This assembly consists essentially of a floor 20a and vertically extending main side walls 21 and 22. A main end wall 23 closes off the back end of the compartment 20 and is secured to walls 21 and 22 in any desired fasion. These components could also, if desired, be molded into a unitary structure.

In any event, the main side walls 21 and 22 and the main end wall 23 are rigidly secured to the frame 10 and project upwardly a relatively short distance which is, in any event, only part of the distance of the ultimate height of the device when it is fully assembled and suitable for occupancy.

Figure 3:
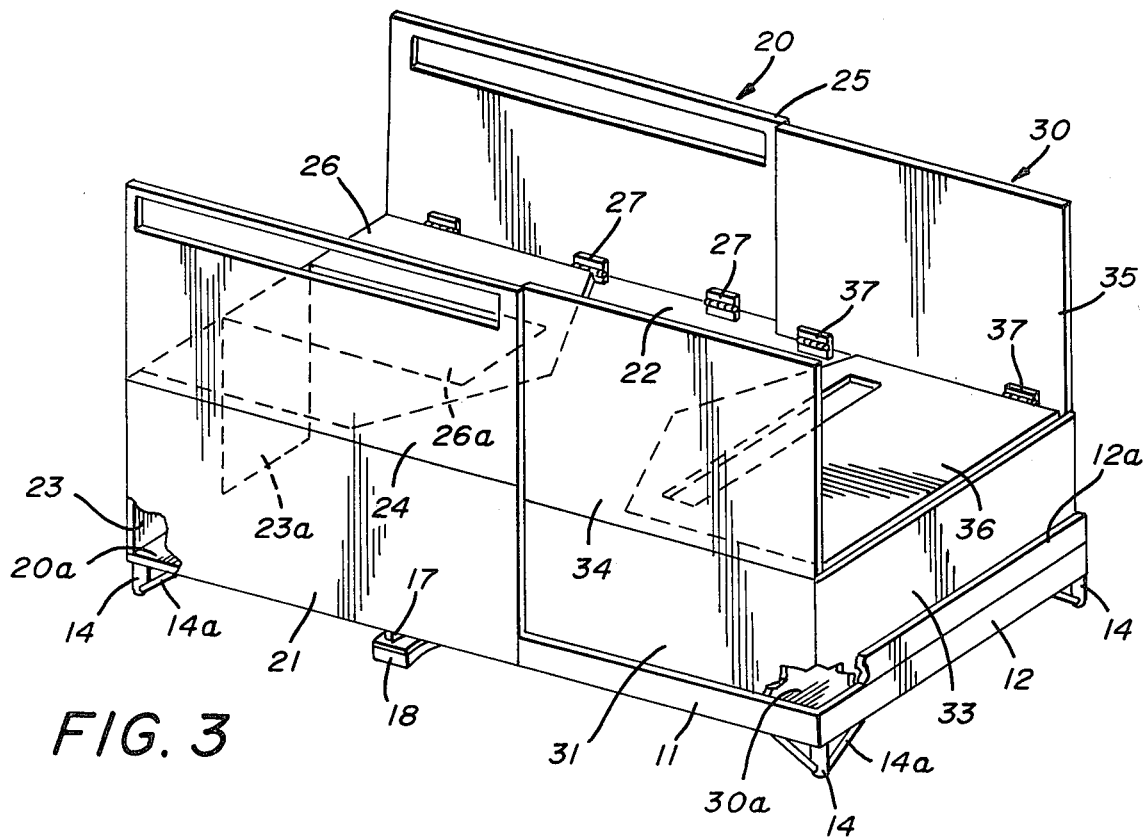
FIG. 3 is a partial perspective view, partially broken away, showing only the camper itself and showing the side walls of the first and second compartments in erected condition.

The main side walls 21 and 22 of first compartment assembly 20 have secured to them auxiliary side walls 24 and 25. These are attached by means of hinges 27,27 and are capable of normally being folded flat or parallel to the floor 20a as shown in FIG. 1. Due to the fact that they are attached by means of the hinges 27,27, they are also capable of being expanded so as to be in coextensive relationship with the main walls 21 and 22 as shown in FIG. 3, for example.

Similarly, an auxiliary end wall 26 is provided and is hinged as at 28 to the main end wall 23. This wall also has the capability of being moved from the flat or horizontal condition of FIG. 3 to the upright condition of FIG. 4.

Latch members 40 (See FIGS. 4 and 7) are provided so that when the auxiliary end wall 26 and sidewalls 24 and 25 are elevated they may be secured together in weather tight condition. These latches 40 consist of a first plate 41 secured to auxiliary wall 25 and a second plate 42 hinged thereto and capable of being releasably attached to auxiliary end wall 26 by wing nut 43. Only one such latch is illustrated, but it should be understood that sufficient number to secure the walls would normally be employed.

Furthermore, main end wall 23 and auxiliary end wall 26 have mating door openings 23a,26a for receipt of a suitable door for access to the interior of the structure.

The second compartment assembly 30 essentially includes a floor 30a and opposed main side walls 31 and 32. A main end wall 33 spans the distance between the ends of the sidewalls and these walls 31,32 and 33 are essentially fixed to the floor 30a in a perpendicular condition similar to walls 21,22 and 23 of first component 20.

Figure 9:
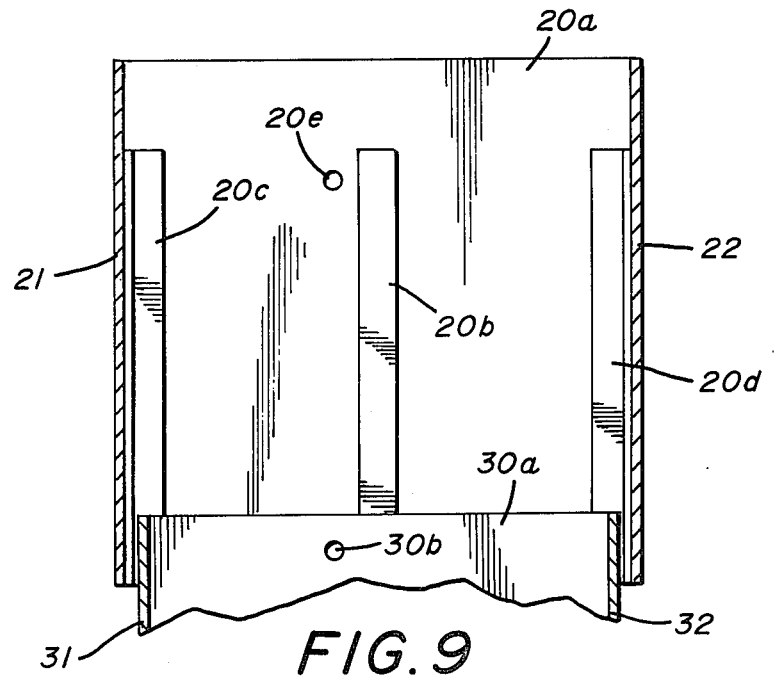
FIG. 9 is partial a plan view showing the floor of the second compartment in partially telescoped relation with the first compartment. Taken along the line 9—9 of FIG. 8.

It should be noted at this point that the width of the floor 30a of the second compartment 30 and the height of the main side walls 31 and 32 and the end wall 33 thereof are less than the corresponding dimensions of the comparable components of first compartment assembly 20 such that they will telescope within the first compartment when the second compartment is moved toward the rear of the frame 10 as clearly shown in FIGS. 1 and 9 of the drawings.

Figure 2:
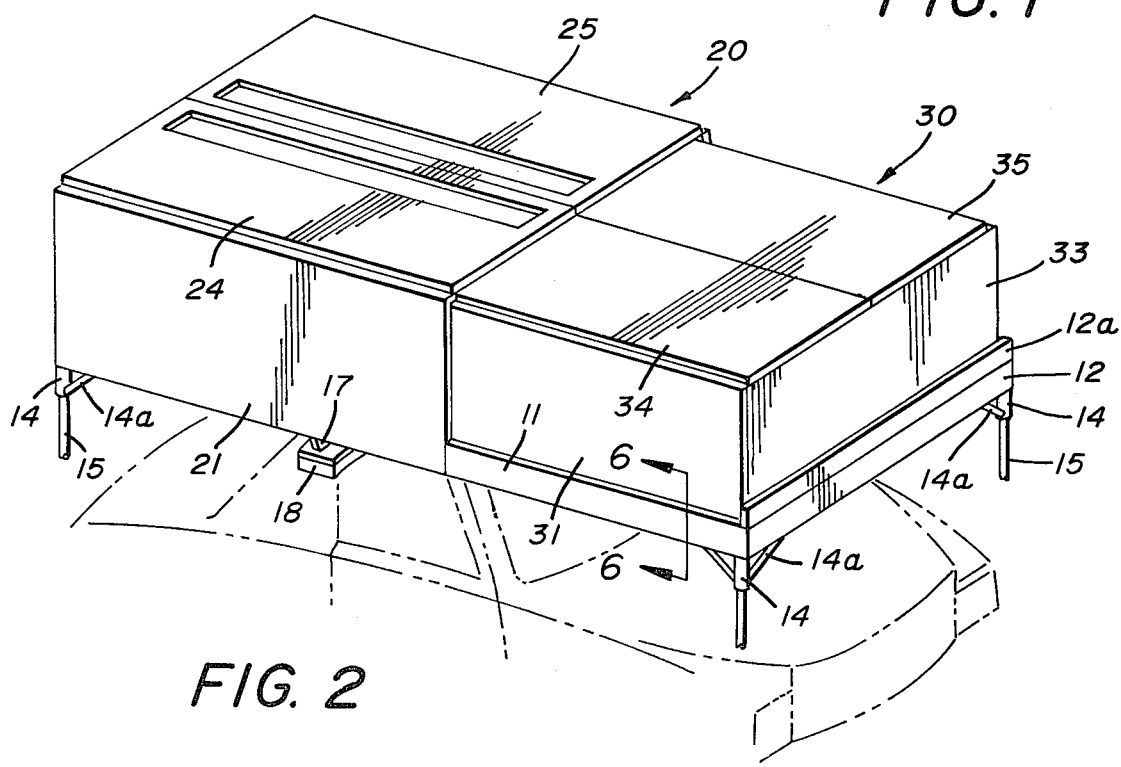
FIG. 2 is a perspective view showing the second compartment extended from the first compartment and illustrates the first stage of expansion in preparation for occupancy.

The second compartment assembly 30 also includes auxiliary side walls 34 and 35 which are secured to the main side walls 31 and 32 and are affixed thereto by hinges 37 so that the walls may be extended from the position of FIG. 2 to the position of FIG. 3.

Figure 4:
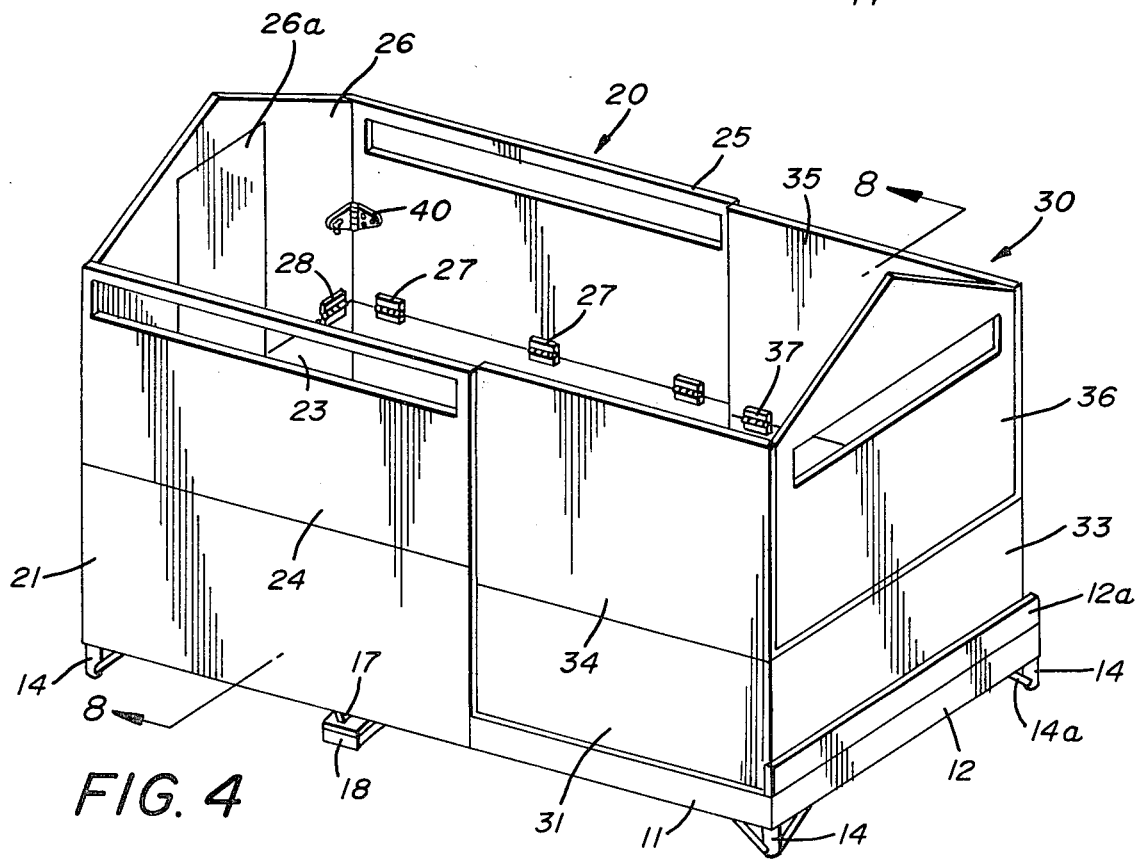
FIG. 4 is a view similar to FIG. 3 showing the end walls of the first and second compartments in elevated condition.

Auxiliary end wall 36 is also hinged to the main end wall 33 and can be elevated from the position of FIG. 3 to the position of FIG. 4. Suitable latches (not shown) similar to those previously described in connection with first compartment 20 are also employed so that the elevated walls 33,34, and 35 can be secured together in weather tight condition.

A roof structure is also provided for both the first and second compartments 20 and 30.

Figure 10:
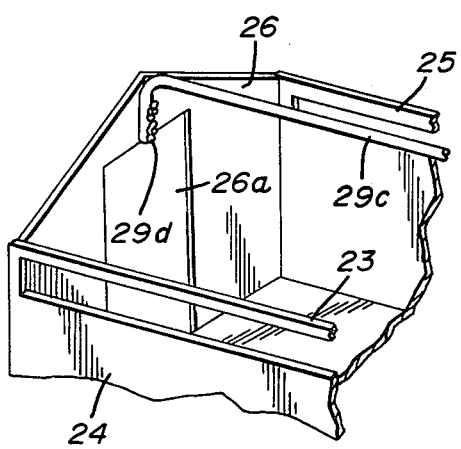
FIG. 10 is a partial perspective view of the roof structure of either the first or second compartments.

For example, the roof structure 29 of the first compartment includes opposed roof sections 29a and 29b which are collapsible for flat disposition as in FIGS. 1 and 2 of the drawings and are also capable of being raised into expanded covering relationship as shown, for example, in FIGS. 5 and 10. Sections 29a and 29b are made of canvas or some other suitable waterproof material and are secured to center rod 29c which extends the length of the compartment. The opposed ends of rod 29c are releasably secured to auxiliary end wall 26 by suitable means such as the wing nuts 29d illustrated in FIG. 10. The opposed end is not illustrated but would be secured to a removable, transversely extending arch piece disposed at the forward end of the first compartment in a similar fashion. In this manner the roof structure 29 can be readily collapsed or erected as desired. The roof structure 29 has been removed in FIGS. 3 and 4 for purposes of illustration of the main wall components of the first compartment 20.

Similarly, the second compartment assembly 30 has a roof structure 39 identical to roof structure 29 including opposed roof sections 39a and 39b and is likewise capable of being collapsed to a flat condition as shown in FIG. 2 of the drawings and elevated to a covering position as shown in FIG. 5. Again, this roof structure has been removed for purposes of illustration in FIGS. 3 and 4.

Figure 8:
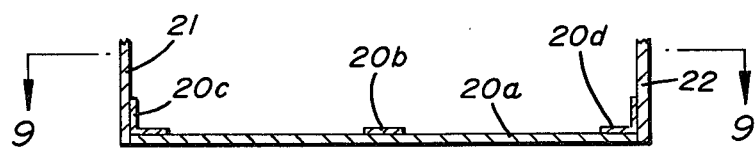
FIG. 8 is a sectional view taken along the line 8—8 of FIG. 4.

With reference to the capability of telescoping second compartment assembly 30 within first assembly 20, attention is called to FIGS. 6,8 and 9 of the drawings. Side rails 11,11 of frame 10 have inwardly directed slide tracks 11a,11a upon which floor 30a rests. The floor 30a is also supported on center rail 13 and these supporting surfaces are disposed so that floor 30a is in a plane above that of floor 20a.

Interiorly of compartment 20 a center slide rail 20b is mounted about equidistant from the sides. Along the sides L-shaped slides 20c and 20d are secured so that compartment 30 can be slid from slide tracks 11a, 11a and 13 onto slides 20b,20c and 20d and into compartment 20.

It will be noted that floors 20a and 30a have through apertures 20e and 30b arranged so that when compartment 30 is completely received within compartment 20 they will be in alignment. Insertion of a suitable pin (not shown) will then insure retention of compartment 30 in place.

It will be readily apparent from a comparison of FIGS. 1 and 5 that the structure is capable of being compacted to a relatively small outside dimension for travel purposes. Thus all of the auxiliary walls of both compartments and the roof elements can be folded down and the second compartment telescoped into the first and held there by inserting the pin in apertures 30b and 20e.

At that time, the only components which in any way interfere with the vision of the vehicle operator are the front two support rods 15,15 and the rail components of the frame 10. This has been found, in practice, to present no significant difficulties at all so that, in fact, the vehicle driver can operate the vehicle in an almost normal fashion.

In order to enhance the usability and attractiveness of the invention, certain auxiliary features are also contemplated.

In this regard, attention is called to FIG. 12 of the drawings wherein it will be noted that means for ingress and egress from the interior of the compartments 20 and 30 are provided.

These means include a ladder assembly 50 which includes a first ladder section 51 and a second ladder section 52. The first ladder section 51 is hinged to the rear wall 23 by the hinges 51a,51a. The second section 52 is hinged to the first section 51 by hinges 52a,52a. In this fashion the ladder can be folded down as illustrated in FIG. 12 to permit access to the interior through the door 23a. When it is desired to move the vehicle and the camper, it is simply necessary to fold the ladder sections 51 and 52 and secure them by a latch or any other suitable means to the rear wall 23 of the first compartment 20.

Figure 13:
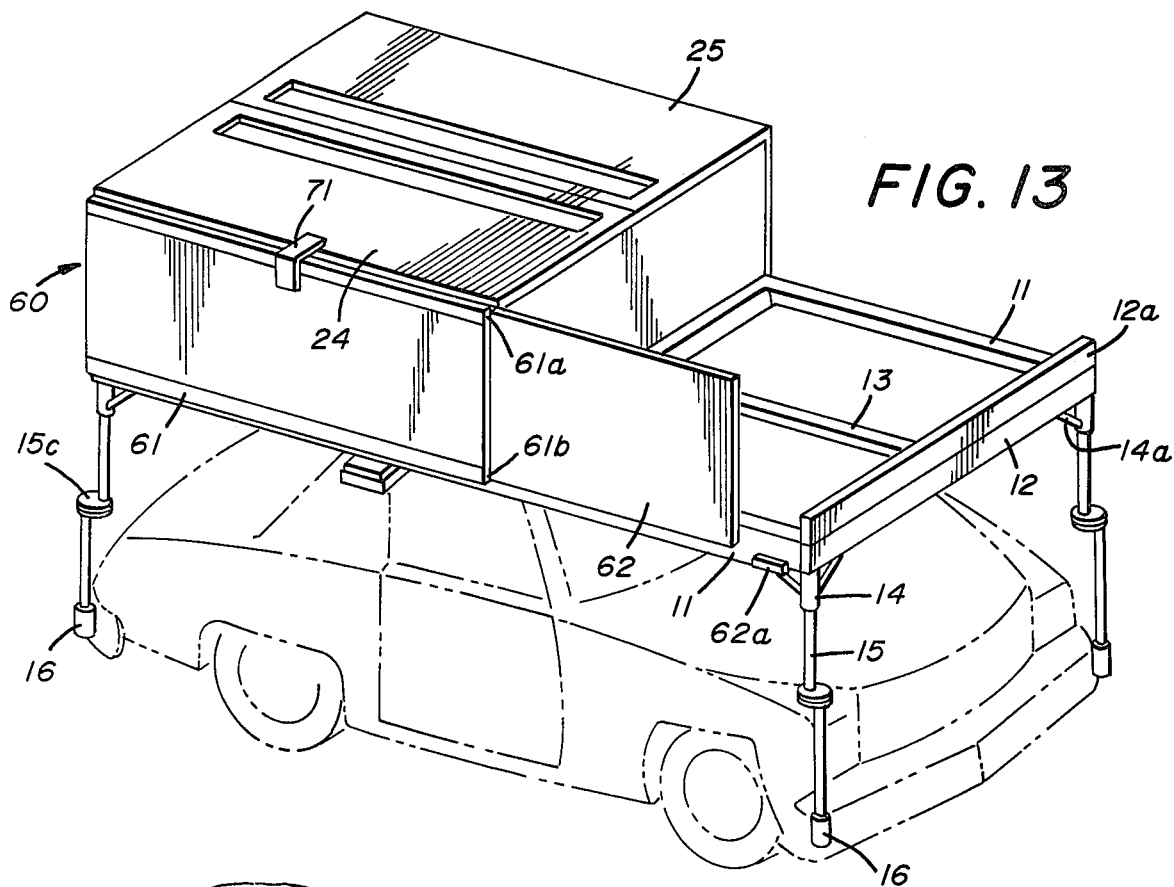
FIG. 13 is a perspective view similar to FIG. 1 showing the canopy modification.
Figure 14:
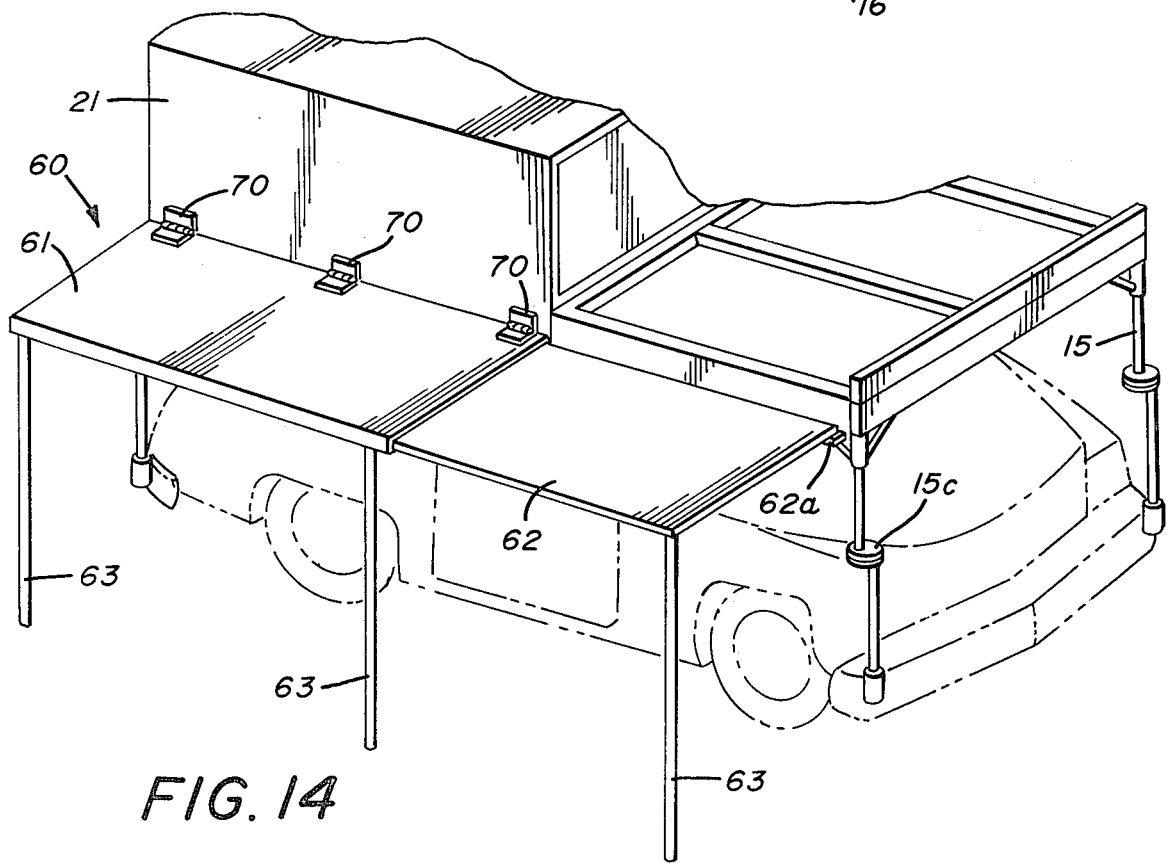
FIG. 14 is a perspective view similar to FIG. 13 showing the canopy in extended condition.

Reference is also made to FIGS. 13 and 14 of the invention wherein an auxiliary canopy structure 60 is disclosed.

This structure includes a first canopy member 61 which is an elongate, generally rectangular panel having U-shaped tracks 61a,61b formed on its inner surface. This member is also hinged to the side wall 21 by means of hinges 70,70 and can be secured in the upright position of FIG. 13 by means of a latch 71.

A second canopy member 62 is also provided and this member is capable of sliding into the tracks 61a,61b as shown in FIG. 13. It is also capable of being pulled out to the extended position shown in FIG. 14 where it rests on a stop member 62a which is attached to the frame side rail 11.

A plurality of removable support legs 63,63 are also provided so that the canopy structure can be supported in the position shown in FIG. 14 when the device is in use.

While a full and complete description of the invention has been set forth in accordance with the dictates of the Patent Statutes, it should be understood that modifications can be resorted to without departing from the spirit hereof or the scope of the appended claims.

For example, it will be noted that the invention has been illustrated in FIGS. 1 and 2 of the drawings and described herein as being mounted on a motor vehicle. It is believed readily apparent that sufficient support is present so that it could be utilized for occupancy in that mode. However, it is also believed apparent that the device can be entirely removed from the vehicle and supported on the ground in a free standing condition by means of the support rods 15, 15. It can also serve as a carport in that mode so that once the travel destination has been reached the vehicle may be operated as a normal vehicle without carrying the excess load attributable by the camper.

Furthermore, it will be noted that generally no materials have been specified herein and it is believed readily apparent that the structure could be made of any suitably strong rigid material which would provide the necessary support such as in the floors 20a or 30a or in the support rods 15,15. On the other hand, it would be advisable to utilize a light weight material so as to minimize fuel consumption and stress on the suspension system of the carrying vehicle.

What is claimed is:

1. A demountable motor vehicle camper, comprising;
   (A) a generally rectangular frame substantially corresponding in planar configuration to the planar configuration of the motor vehicle said frame having a first and a second part;
   (B) support means for releasably securing said frame to said motor vehicle above the top plane thereof;
   (C) said first first compartment assembly secured to a part of said frame;
   (D) a second compartment assembly carried by said frame and slidable thereon into and out of said first compartment along the longitudinal axis of said vehicle
      (1) whereby said second compartment assembly is supported on the said second part of said frame when extended from said first compartment assembly; and
   (E) said support means being capable of supporting said frame and said first and second compartment assemblies in freestanding condition when released from said motor vehicle.

2. The camper of claim 1 wherein said first and second compartment assemblies are expandable in a direction normal to the longitudinal axis of said frame and to form living areas.

3. The camper of claim 2 wherein said first compartment assembly includes
   (A) a floor secured to said frame;
   (B) opposed main side walls and a main end wall projecting upwardly from the perimeter of said floor; and
   (C) auxiliary side and end walls hinged to said main side and end walls for movement between a position parallel to said floor and a position normal thereto.

4. The camper of claim 3 wherein said first compartment includes a collapsible roof assembly supported by said auxiliary side walls.

5. The assembly of claims 2 or 3 wherein said second compartment assembly includes
   (A) a floor;
   (B) opposed main side walls and a main end wall projecting upwardly from said perimeter of said floor; and p1 (C) auxiliary side and end walls hinged to said main, side and end walls for movement between a position parallel to said floor and a position normal thereto.

6. The camper of claim 5 wherein said second compartment assembly includes a collapsible roof assembly supported by said auxiliary side walls; said roof assembly being spaced from said floor a distance equal to or greater than the heighth of said main side walls.

7. The camper of claim 1 wherein said second compartment has outer dimensions smaller than the inner dimensions of said first compartment prior to expansion thereof.

8. The camper of claim 1 wherein a laterally extendible canopy assembly is carried exteriorly of said first compartment.

9. The camper of claim 8 wherein said laterally extendible canopy assembly includes
   (A) a first panel hinged to one of said main side walls of said first compartment;
   (B) a second panel slidably secured to said first panel; and
   (C) means for supporting said canopy assembly in its laterally extnded position.

10. The camper of claim 1 wherin means for ingress and egress are carried by said firs compartment assembly.

11. A motor vehicle caper, comprising;
    (A) a generally rectangular frame sustantially corresponding in planar configuration to the lanar configuration of the motor vehicle;
    (B) means for releasably securing said frame to said motor vehicle;
    (C) a first compartment assembly secured to a part of said frame; and
    (D) a second compartment assembly carried by said frame and slidable thereon into and out of said first compartment along the longitudinal axis of said frame
       (1) whereby said second compartment assembly is supported on the remaining part of said frame when extended from said first compartment assembly; and
    (E) said means for releasably securing said frame to said motor vehicle including at least four support rods secured to and depending from said frame for releasable engagement with the frame of the motor vehicle adjacent the corners thereof; said support members being adjustable longitudinally and transversely relative to the longitudinal axis of said frame.

12. The camper of claim 11 wherein
    (A) said frame has front and rear ends;
    (B) said front end of said frame including opposed side rails and a front rail interconnecting the ends of said side rails; and
    (C) said front end of said frame extending over the windshield and hood portion of the vehicle when said camper is secured thereto.

13. The camper of claim 12 wherein said second compartment is slidable into and out of said first compartment on said side rails; and means for retaining said second compartment within said first compartment.

14. The camper of claim 13 wherein said means for securing said camper to said vehicle include
    (A) a plurality of first support rods attachable to said frame;
    (B) a plurality of second support rods attachable to said vehicle;
    (C) a plurality of adjustment means interconnecting said first and second support rods adapted to vary the relative disposition of said first and second rods.

* * * * *